United States Patent

[11] 3,623,994

[72] Inventors Martin Robert Royce;
Joseph Stanley Martin, Jr., both of Lancaster, Pa.
[21] Appl. No. 872,832
[22] Filed Oct. 31, 1969
[45] Patented Nov. 30, 1971
[73] Assignee RCA Corporation

[54] VERY SHORT LUMINESCENT DECAY-TIME PHOSPHOR
5 Claims, 2 Drawing Figs.

[52] U.S. Cl. .................................................. 252/301.4 R
[51] Int. Cl. ...................................................... C09r 1/68, H01j 29/20
[50] Field of Search ............................................ 252/301.4

[56] References Cited
OTHER REFERENCES

Blasse et al.— A New Phosphor For Flying-Spot Cathode-Ray Tubes for Color Television: Yellow-Emitting $Y_3Al_5O_{12}$ $Ce^{3+}$ — Applied Physics Letters, Vol. 11, No. 2, 15 July 1967, pages 53–54.

Blasse et al.— Investigation of Some $Ce^{3+}$ Activated Phosphors- - Journal of Chemical Physics, Vol. 47, No. 12, 12 December 1967, pages 5139–5145

*Primary Examiner*— Robert D. Edmonds
*Attorney*— Glenn H. Bruestle

ABSTRACT: A short-decay-time ultraviolet-emitting phosphor consisting essentially of yttrium aluminum oxide activated by cerium. The phosphor may be described by the molecular formula $YAlO_3:Ce$. The disclosure includes a cathode-ray tube having a viewing screen structure comprised of the new phosphor.

INVENTORS
MARTIN R. ROYCE &
BY JOSEPH S. MARTIN, JR.

Attorney

VERY SHORT LUMINESCENT DECAY-TIME PHOSPHOR

BACKGROUND OF THE INVENTION

This invention relates to a new luminescent material or phosphor which, when excited by cathode rays, emits ultraviolet radiation in the spectral region of about 3,700 A.U. (Angstrom Units) and has a very short luminescence decay time after the exciting cathode rays are removed. The invention includes a cathode-ray tube having a luminescent viewing screen structure comprised of the new phosphor.

Cerium-activated phosphors are known in the phosphor art. Cerium-activated lanthanum phosphate, which is described by the formula $LaPO_4$:Ce, and cerium-lithium-activated calcium magnesium silicate, described by the formula $Ca_2MgSi_2O_7$:Ce:Li, are ultraviolet light emitters and exhibit a very short-decay-time after removal of excitation. Cerium-activated yttrogarnet, described by the formula $Y_3Al_2(AlO_4)_3$:Ce, and cerium-activated yttroalumite, described by the formula $Y_3Al_5OB12$:Ce, also exhibit a very short decay time but luminesce in the visible spectrum.

A short-decay-time ultraviolet-emitting phosphor can be used in cathode-ray tubes used as flying spot scanners to produce an output signal. Such phosphors can also be used to produce the indexing signal in the viewing screen structure of indexing-type multicolor kinescopes; for example, in the tubes described in U.S. Pat. No. 3,271,610 to Harold B. Law. In practice, the prior art short-decay-time phosphors are not ideal for producing an indexing signal since they leave residual images remaining on the viewing screen. These residual images reduce the final resolution of the viewed image output. The very short-decay-time of these prior art phosphors is not sufficiently short to completely decay the viewed image within nonperceptible limits at the scanning frequency necessary for a practical cathode-ray-tube application.

SUMMARY OF THE INVENTION

The new ultraviolet-emitting phosphor consists essentially of yttrium aluminum oxide activated by cerium, and may be described by the molecular formula $YAlO_3$:Ce.

The new phosphor has a different chemical composition than yttroalumite and yttrogarnet. It emits ultraviolet radiation which peaks at approximately 3,700 A.U. when excited by cathode rays. It also exhibits a shorter decay time after removal of the excitation than prior art phosphors. This new phosphor also has a higher ultraviolet efficiency than prior art ultraviolet-emitting cerium-activated phosphors, such for example as cerium-activated lanthanum phosphate.

The invention includes an improved cathode-ray tube having a viewing screen structure comprised of the new phosphor, which may be, for example, a flying spot scanner or an indexing type multicolor kinescope. When an indexing-type tube is operated at the same scanning frequency as previously used, a viewer does not perceive on the viewing screen of the improved tube any residual images resulting from the decay characteristics of the ultraviolet-emitting phosphor. The improved tube also exhibits a higher resolution image output than tubes using some prior art phosphors. This results, at least, in part because of the shorter decay time of the new phosphor; whereby each image decays to nonperceptible limits prior to the formation of the succeeding image.

DESCRIPTION OF PREFERRED EMBODIMENT

Figure 1:
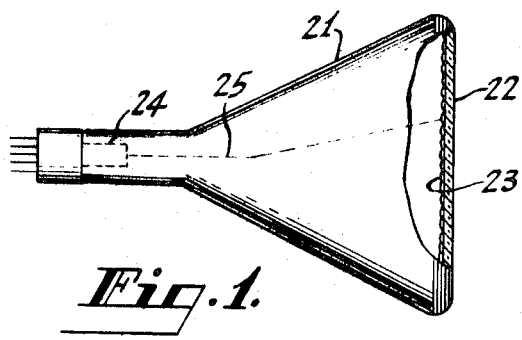
FIG. 1 is a broken-away side view of an improved cathode-ray tube which includes a viewing screen structure comprising the phosphor of this invention.

The tube illustrated in FIG. 1 comprises a glass envelope 21 having a faceplate 22. On the inner surface of the faceplate 22 is a viewing screen 23 comprising the phosphor of the invention. At the opposite end of the tube is an electron gun 24 which projects an electron beam 25 to strike the screen 23. The luminescence of the phosphor can be conducted through the faceplate 22 as in the flying spot scanner, or can be conducted toward the electron gun 24 as in a sensing type kinescope.

The new phosphor may be described by the formula $YAlO_3$:Ce and consists essentially of yttrium aluminum oxide with cerium included as an activator. The new phosphor may be prepared by a preferred procedure given in example 1 with the alternate procedure given in example 2.

EXAMPLE 1

Dry mix for approximately 5 minutes a quantity of materials of the following proportions: 5.05 grams Yttrium Oxalate $Y_2(C_2O)_3$, 7.50 grams Aluminum Nitrate Nonahydrate $Al(NO_3)_3 \cdot 9H_2O$, 2.64 grams Ammonium Sulfate $(NH_4)_2SO_4$, and 0.01 grams Ceric Carbonate $Ce_2(CO_3)_3$. Heat the material at approximately 1,300° C. for 2 hours. The cooled material is the phosphor of the invention. This phosphor may be refired at 1,300° C. for 2 hours to improve its properties. The phosphor has approximately the molecular formula $YAlO_3$:0.005Ce.

EXAMPLE 2

Heat about 800 milliliters of demineralized water to 50° C. and while stirring add 17.55 grams of anhydrous aluminum nitrate. A special dehydrated grade of aluminum nitrate designated RCA No. 33A615 is preferred. A small amount of dilute nitric acid may be added to promote solubility of the aluminum nitrate. After the aluminum nitrate has completely dissolved, stir in 10.153 grams of yttrium oxide followed by dropwise addition of a stoichiometric amount of dilute nitric acid to convert the yttrium oxide to yttrium nitrate. After a complete yttrium and aluminum nitrate solution is obtained, filter to remove insoluble material which may be present. Then, add 0.065 grams of hexahydrate $Ce(NO_3)_3 \cdot 6H_2O$. When the solution is colorless and clear, heat it to 80° C. and stir in an excess amount (approximately 800 ml.) of dilute (about 29 weight percent) ammonium hydroxide. Continue heating and stirring for one hour. Successively centrifuge and wash the white precipitate with demineralized water until it is free from ammonia odor and/or the wash liquors achieve a pH of 7. Wash the precipitate 2 times in acetone and air dry for 12 to 15 hours. Break up the dry precipitate in a mortar and pestle, sieve, and thoroughly mix the powder. Heat the powder in an open silica crucible from 600° C. to 1,300° C. for approximately a 3 to 4 hour rise time, and hold at 1,300° C. for 1 to 4 hours. Cool, mildly grind, and sieve the product. The cooled material is the phosphor of the invention. This phosphor has approximately the molecular formula $YAlO_3$:0.005Ce.

Figure 2:
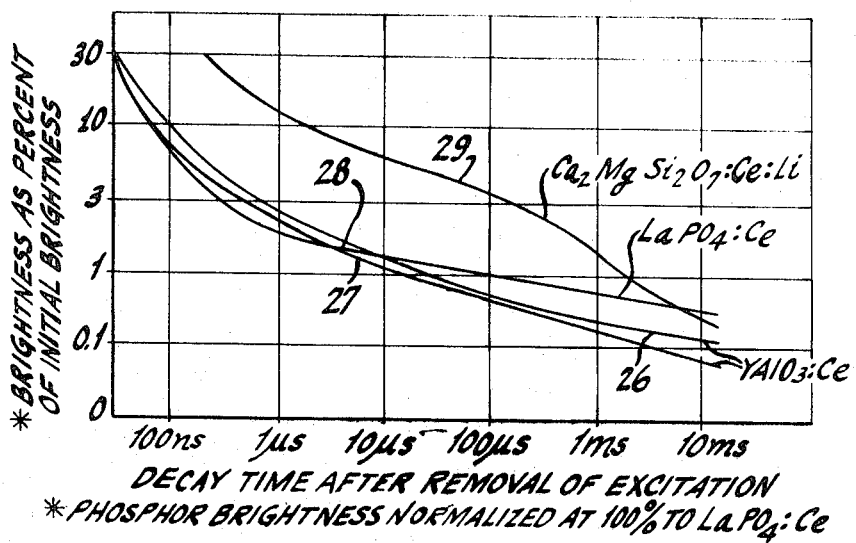
FIG. 2 is a graph including curves illustrating a portion of the luminescence decay of the phosphor of the invention and of some prior art phosphors.

The low-level decay characteristics of samples of the new phosphor $YAlO_3$:Ce are illustrated by the curves 26 and 27 of FIG. 2. The curve 26 illustrates a new phosphor prepared by the process of example 1, and the curve 27 illustrates a new phosphor prepared by the process of example 2. The curves were obtained by measuring the luminescence emission decay from a sample excited by cathode rays. The curves describe the luminescence decay after the emission has decayed to 30 percent since interest exists in the maximum (shortest) decay time. A similar curve 28 is shown for a $LaPO_4$:Ce phosphor and a curve 29 for a $Ca_2MgSi_2O_7$:Ce:Li phosphor for purposes of comparison. The curves shown in FIG. 2 all originate at zero time (not shown) and are normalized at 100 percent brightness to $LaPO_4$:Ce which is used as a brightness standard. It is observed that the curves 28 and 29 for the prior art phosphors, while considered to have very short decay time by ordinary standards, exhibit longer and higher persistences and, therefore, require a longer time to decay than the curves 26 and 27 for the new phosphor of the invention.

As used in this specification, a very short decay-time phosphor means that the time to decay to 10 percent of initial brightness is less than one microsecond. The new phosphor shown in curves 26 and 27 is seen to decay to less than 1 percent of initial brightness in a shorter time than the prior art phosphors shown in curves 28 and 29 and continues to decay at a faster rate. Substituting the new phosphor for a prior art phosphor in an indexing type multicolor kinescope reduces the residual images on the viewing screen, permits higher scanning rates, and results in a higher resolution image output.

The table compares the decay characteristics and ultraviolet efficiency of prior art phosphors with the new phosphor. The ultraviolet efficiency is measured through a combination of a No. 7-60 filter and a $NiCl_2$ filter. The ultraviolet efficiency of the screen of the new phosphor is higher than that of $LaPO_4$ which is used as an ultraviolet-emitting standard.

The phosphor of the invention uses cerium as an activator as do many prior art phosphors. Useful ultraviolet-emitting properties are obtained where the cerium range is 0.0005 to 0.5 mole cerium per mole of the host material. The preferred range is about 0.005 to 0.10 mole cerium per mole yttrium aluminum oxide.

The crystal structure of the new phosphor, determined by X-ray diffraction techniques and comparison with the ASTM card index, is believed to be a perovskite type. Yttrium can be chemically combined with aluminum oxide in various stoichiometric proportions. The phosphor of this invention is believed to exhibit a 1:1 correspondence of yttrium oxide with aluminum oxide while yttrogarnet is believed to have a 3:5 correspondence. For example, $Y_2O_3 \cdot Al_2O_3 = 2YAlO_3$ has one mole yttrium oxide to one mole aluminum oxide.

TABLE

| | Phosphor sample | | | |
| --- | --- | --- | --- | --- |
| | | | $YAlO_3$:Ce sample No. | |
| | $LaPO_4$:Ce | $Ca_2MgSi_2O_7$ Ce:Li | 93-1T | 32-2 |
| Time for phosphor to decay to percent of original brightness: | | | | |
| 30% (nanosecond) | 40 | 300 | 40 | 40 |
| 10% (nanosecond) | 80 | 2,500 | 100 | 80 |
| 3% (microsecond) | 0.45 | 250 | 3 | 0.7 |
| 1% (microsecond) | 250 | 2,500 | 25 | 35 |
| Decay at 15 millisecond (percent) | 0.5 | 0.45 | 0.15 | 0.07 |
| Ultraviolet efficiency [1] (percent) | 100 | 45 | 116 | 111 |
| Synthesis | | | [2] | [3] |

[1] Ultraviolet efficiency measured through a combination of a No. 7-60 filter and a $NiCl_2$ filter.
[2] Example 1.
[3] Example 2.

We claim:

1. An ultraviolet-emitting luminescence material consisting essentially of yttrium aluminum oxide activated by cerium the atomic ratio of yttrium to aluminum being substantially 1:1.

2. A composition according to claim 1 consisting essentially of a chemical correspondence of equimolar proportions of yttrium oxide and aluminum oxide.

3. A composition according to claim 1 wherein said cerium content is 0.0005 to 0.5 mole per mole yttrium aluminum oxide.

4. A luminescence material according to claim 1 having the molecular composition $YAlO_3$:Ce wherein $x$ is in the range of 0.0005 to 0.5 mole.

5. A luminescent material according to claim 1 having the molecular composition $YAlO_3$:0.005Ce.

* * * * *

UNITED STATES PATENT OFFICE
CERTIFICATE OF CORRECTION

Patent No. 3,623,994      Dated November 30, 1971

Inventor(s) Martin R. Royce et al

It is certified that error appears in the above-identified patent and that said Letters Patent are hereby corrected as shown below:

Column 1, line 20     Change "$Y_3Al_5OB12:Ce$" to -- $Y_3Al_5O_{12}:Ce$ --

Column 4, line 5     After "$Ca_2MgSi_2O_7$" add --:--

Column 4, line 21     After "cerium" add --,--

Column 4, line 30     Change "$YAlO_3:Ce$" to -- $YAlO_3:xCe$ --

Signed and sealed this 13th day of June 1972.

(SEAL)
Attest:

EDWARD M. FLETCHER, JR.
Attesting Officer

ROBERT GOTTSCHALK
Commissioner of Patents